United States Patent [19]

Himpsl et al.

[11] Patent Number: 4,581,340
[45] Date of Patent: Apr. 8, 1986

[54] FLUID CRACKING CATALYST AND METHOD OF MAKING SAME FROM WASTE CATALYST MANUFACTURE FINES

[75] Inventors: Francis L. Himpsl, Matawan; Robert W. Andrews, Toms River; Barry K. Speronello, River Edge, all of N.J.

[73] Assignee: Engelhard Corporation, Menlo Park, N.J.

[21] Appl. No.: 727,985

[22] Filed: Apr. 29, 1985

Related U.S. Application Data

[63] Continuation-in-part of Ser. No. 532,346, Sep. 15, 1983, Pat. No. 4,520,119.

[51] Int. Cl.$^4$ ........................ B01J 21/16; B01J 29/08
[52] U.S. Cl. ...................................... 502/65; 502/67; 502/68
[58] Field of Search ............................. 502/65, 67, 68

[56] References Cited

U.S. PATENT DOCUMENTS 4,493,902  1/1985  Brown et al. ................... 502/65
4,520,119  3/1985  Andrews et al. ................ 502/67

Primary Examiner—Carl F. Dees
Attorney, Agent, or Firm—Inez Moselle

[57] ABSTRACT

Co-product fines from the manufacture of zeolitic cracking catalysts from microspheres of calcined clay have heretofore been discarded as a waste stream. These fines, recovered as a moist cake, are slurried in a sodium silicate solution, spray dried to form microspheres and ion-exchanged initially at high pH and then at lower pH to produce attrition-resistant cracking catalysts which produce low levels of coke during use.

17 Claims, No Drawings

FLUID CRACKING CATALYST AND METHOD OF MAKING SAME FROM WASTE CATALYST MANUFACTURE FINES

RELATED APPLICATIONS

This is a continuation-in-part of Ser. No. 532,346, filed Sept. 15, 1983 now U.S. Pat. No. 4,520,119.

BACKGROUND

This invention relates to a process for producing attrition resistant zeolitic FCC catalysts from a fine particle size, zeolite-rich material generated as a co-product in the practice of a recent process and product innovation described in U.S. Pat. No. 4,493,902, "FLUID CRACKING CATALYST COMPRISING MICROSPHERES CONTAINING MORE THAT ABOUT 40 PERCENT BY WEIGHT Y-FAUJASITE AND METHODS FOR MAKING".

The present invention differs from the process of Ser. No. 532,346, which also utilizes a fine particle size, zeolitic co-product of zeolite X catalyst manufacture, in that the fine particle size co-products of in situ zeolite catalyst manufacturing in accordance with U.S. Pat. No. 4,493,902 are of much higher zeolite content than that of the co-products utilized in practice of Ser. No. 532,346. Thus, in practice of the instant invention the fine particle size zeolitic material which is a co-product contains about 50-70% zeolite Y, as opposed to ca. 20-40% in the process of Ser. No. 532,346.

In a presently most preferred embodiment, the invention relates to the recovery of co-product zeolite-rich fines obtained in commercial practice of the embodiment of the invention substantially as described in Examples 1 and 2 of U.S. Pat. No. 4,493,902. These examples describe a process in which microspheres high in zeolite Y content and of noteworthy cracking activity and hardness are produced by immersing porous microspheres comprising a mixture of calcined clays in a solution comprising alkaline sodium silicate and a clear solution of "external" amorphous zeolite seeds. The reactants (microspheres of calcined clay and alkaline sodium silicate solution) are heated in the presence of the seeding material and zeolite Y crystals form in situ in the pores of channels in the microspheres at levels usually in the range of 50% to 70%. The entire disclosure of U.S. Pat. No. 4,493,902 is incorporated herein by cross-reference thereto. The procedure described in said patent in which seeds are incorporated into the aqueous phase of the reaction mixture will be referred hereinafter to as an externally seeded in situ process. The procedure in which seeds are a component of the unreacted microspheres, e.g., Example 3 of the patent, will be referred to as an internally seeded in situ process.

In commercial practice of the externally and internally seeded variations of the in situ processes of U.S. Pat. No. 4,493,902, discrete particles having a high content of crystalline zeolite Y may form in the aqueous reaction liquid as well as within the channel of pores and on the surfaces of the microspheres. These fines are considerably smaller than grade sized microspheres, the latter typically being 20 to 150 microns in diameter. An alkaline sodium silicate effluent containing finely divided zeolite-rich particles is formed. This represents a waste of zeolite as well as a disposal expense since the pH is typically 11.0 to 11.5. One solution would be to recover the finely divided co-product crystals from the aqueous effluent and then reconstitute them into microspheres by addition of a binder and subsequently ion-exchange the resulting microspheres to provide fluid cracking catalysts. It is well known, however, that it is difficult to produce microspheres that are both high in zeolite content and also sufficiently resistant to attrition to be used in modern FCC units. See U.S. Pat. No. 4,493,902. Consistent with this, we have found that it is more difficult to produce bonded catalysts which are highly resistant to attrition when using finely divided co-products of U.S. Pat. No. 4,493,902 as compared to the finely divided co-products of Ser. No. 532,346.

The microspheres of calcined clay used as reactants in the process of U.S. Pat. No. 4,493,902 have an average diameter of about 60 to 70 microns and contain a minimal amount, e.g., 3–5% weight percent, of particles finer than 20 microns, equivalent spherical diameter. Typically, the largest particles have a diameter of about 150 microns. The reason for restricting fines in the microspheres utilized as a reactant is that the microspheres will retain substantially the same size and shape of the original microspheres during aging and crystallization. The content of particles finer than about 20 microns in the finished crystallized catalyst product should be limited because it is difficult or impossible to retain such particles in fluid catalytic cracking units. Furthermore, fines introduced with the reactants and/or generated during processing interfere with the operation of filtration equipment used in carrying out the ion-exchange treatment employed to convert the crystallized microspheres into catalytically active and selective particles.

When some of the production schemes described in U.S. Pat. No. 4,493,902 are conducted on a commercial scale, fines (e.g., particles finer than about 20 microns equivalent spherical diameter) may be generated during aging and/or crystallization. The amount of such fines may vary, depending, among other things, on the type and quality of the seeds as well as the attrition-resistance of the precursor microspheres and their response to aging and crystallization. These fines typically contain about 50 to 70 percent sodium zeolite Y (as estimated by quantitative X-ray diffraction determinations). There is an indication that at least part of the zeolite Y in the fines results from a chemical reaction carried out in the aqueous phase (in contrast to zeolite that is present as a result of breakdown of crystallized microspheres). In some cases, small amounts of the zeolite having the X-ray pattern of sodium zeolite B may also be contained in the fines. Also present is amorphous silica-alumina derived at least in part from calcined clay. A small amount of filter aid material (e.g., diatomaceous earth) is normally present in fines from a commercial plant. The origin of such material will be explained subsequently.

The fines generated as a co-product stream are advantageously removed from the mainstream of crystallized microspheres before the crystallized microspheres undergo filtration to remove the mother liquor. Removal of the fines can be accomplished by passing the slurry of crystallized microspheres and mother liquor through one or more hydroclones before the slurry undergoes filtration. In the hydroclones, grade material is discharged as the underflow effluent and is fed to the deliquoring filter. The overflow effluent from the primary hydroclones is combined with the filtrate from the deliquoring filter and run through a secondary hydroclone. The underflow again goes to the deliquoring filter and the overflow becomes the "unclarified" sodium silicate solution. Mother liquor is separated from the fines for eventual reuse, concentration and sale. Such a concentrated mother liquor by-product typically contains about 15% by weight $Na_2O$, 29% by weight $SiO_2$ and 0.1% $Al_2O_3$, the balance being water. In other words, the concentrated mother liquor has a composition approximating that of sodium disilicate and has a concentration of about 44% by weight.

A conventional rotating drum filter precoated with a filter aid such as diatomaceous earth is used to remove the fines from the alkaline sodium silicate liquor. The fines build up on the filter and are gradually scraped as a moist cake from the surface of the drum. The cake removed from the filter is also associated with entrained sodium disilicate solution (or solution having a $Na_2O/SiO_2$ ratio similar to that of the disilicate), typically in amount corresponding to about 3-5% $SiO_2$ (weight basis), based on the dry weight of the fines. The material removed from the filter has been handled in the past as waste material, creating a potential disposal problem. It is this material that is converted to an active cracking catalyst by practice of the present invention.

Procedures for preparing fluid zeolitic cracking catalyst particles that involve mixing sodium silicate solution with zeolite crystals and spray drying the slurry to form microspheres are known. Reaction products containing synthetic faujasite and obtained from sodium hydroxide solution and a mixture of calcined kaolin clay are used in processes described in the following: U.S. Pat. Nos. 3,515,683; 3,451,948; and 3,458,454 all assigned to Air Products and Chemicals, Inc. In these processes the zeolite-containing reaction products are ground before spray drying. A grinding step is also utilized when the feed to the spray dryer is obtained by reacting calcined clay and sodium hydroxide solution in the absence of hydrated clay. See U.S. Pat. No. 3,515,682, also assigned to Air Products and Chemicals, Inc. In U.S. Pat. No. 3,451,948 ion-exchange after spray drying is carried out by neutralizing the slurry at pH 5.5-8.5 at 30°-40° C., in the absence of ammonium nitrate, followed by ion-exchange at pH 5.5-8.5 at 30°-40° C. The patent teaches that pH should be maintained above 4.

Attempts by the coinventors in the subject application to bind the drum fines produced as a side stream by the embodiment of U.S. Pat. No. 4,493,902 using internal zeolite growth seeds (e.g., Example 3 of the '902 patent) were moderately successful in producing a product having a satisfactorily low attrition value. Using a sodium silicate binder and spray drying, the attrition value was almost 2%/sec when measured by the EAI (Engelhard Attrition Index) test cited in U.S. Pat. No. 4,493,902. This value is similar to that of some present day commercial FCC catalyst but is above the EAI maximum value of 1%/sec which we preferred to produce. Some improvements resulted when hydrous kaolin was introduced into the spray dryer feed but desired EAI values of 1%/sec or below were not achieved. Surprisingly, by using fines obtained from externally seeded processed feed instead of internally initiated feed, attrition-resistant catalyst particles were produced in numerous runs; a single run resulting in an EAI as high as 1.9%/sec was an exception.

We have also found that the procedures used in the ammonium ion-exchange treatment to reduce sodium in the spray dried particles should be carefully controlled, as described hereinafter, in order to obtain products of desired hardness.

THE INVENTION

By the process of the invention, the substantially −20 micron particle size co-product from the commercial manufacture of zeolitic cracking catalysts by the in situ process of U.S. Pat. No. 4,493,902, preferably the externally seeded variation of U.S. Pat. No. 4,493,902, is converted into fluidizable zeolitic microspheres that are sufficiently attrition resistant to undergo ion-exchange treatment with an ammonium salt solution to reduce sodium content, resulting in fluidizable particles of cracking catalyst sufficiently attrition resistant for use in cracking a hydrocarbon feedstock.

Cracking catalysts of the invention are active, selective and are sufficiently attrition-resistant to be useful in most present day FCC units. The catalysts of this invention differ in chemical composition and performance characteristics from fluid catalysts obtained by the in situ processing that gives rise to the generation of the fines used as feed material in the process of the invention. For example, catalysts of the invention have different pore structure and chemical composition. Catalysts of the invention show promise in cracking heavy feedstocks such as those containing residual fractions of crudes because of the unusually low levels of coke and hydrogen production when used in cracking petroleum feedstocks. Thus, the invention provides a means for producing a family of catalysts which may differ in properties and end-use applications.

In accordance with the process of the invention, unwashed, undried and unground co-product fines, which contain sodium zeolite Y, amorphous silica-alumina residue of calcined clay and entrained sodium silicate mother liquor solution, preferably fines that are 20 microns or finer, are mixed with additional sodium silicate solution having a controlled $Na_2O/SiO_2$ molar ratio and the mixture is spray drieJ, also under controlled conditions. The sodium silicate solution should preferably have a high $Na_2O/SiO_2$ ratio in order to reproducibly manufacture catalysts of adequate attrition resistance. A preferred $Na_2O/SiO_2$ molar ratio is in the range of about 0.40 to 0.55. The mother liquor produced during the crystallization of sodium faujasite crystals in the microspheres composed of a mixture of calcined clays will have a $Na_2O/SiO_2$ molar ratio of approximately 0.5 which is within the preferred range. Consequently, when such mother liquor is used in the spray drying step, two by-product streams of the basic process may be recovered and combined to provide novel cracking catalysts. Alternatively, the sodium disilicate may be the mother liquor produced in the in situ manufacture of other cracking catalyst such as HEZ ™ catalysts. The microspheres produced by spray drying then undergo controlled ion-exchange with ammonium ions without being dried during the exchange treatment. During the initial stage of ion-exchange with ammonium ions to replace readily releasable sodium ions, pH is maintained at 4.5 to 5.0. Thereafter pH is reduced to values in the range of 2.0 to 3.5, preferably 2.5 to 3.5, and most preferably 2.5 to 3.0, and maintained in that range during further exchange with ammonium and/or other cations such as rare earth ions.

An aspect of the preferred embodiment of the invention relates to a process for producing a family of fluid cracking catalysts. The process comprises the steps of:

(a) mixing microspheres composed of a mixture of kaolin clay calcined at least substantially through the characteristic exotherm and metakaolin with (1) a solution containing sodium silicate or sodium silicate and sodium hydroxide and (2) zeolite seeds which are incorporated with (1) and (2) prior to step (b), below, the seeds preferably being a clear aqueous solution of external seeds;

(b) heating the mixture of (1), (2) and seeds until crystals of sodium zeolite Y form in and on the surface of the microspheres, resulting in the formation of microspheres containing at least 40% sodium zeolite Y, as determined by X-Ray diffraction, and also the residue of calcined kaolin clay, and an alkaline mother liquor comprising sodium silicate which the $Na_2O/SiO_2$ ratio approximates that of sodium disilicate, the mother liquor containing fine particles of sodium zeolite Y and amorphous alumina-silica derived from calcined kaolin clay;

(c) separating microspheres from step (b) from the mother liquor under conditions such that ultrafine (e.g., substantially $-20$ micron) sized crystals of zeolite Y and other ultrafine (e.g., substantially $-20$ micron) sized solids are recovered as an aqueous effluent;

(d) recovering the ultrafine size crystals of sodium zeolite Y and other ultrafine solids from the aqueous phase;

(e) without washing, drying or grinding, mixing the recovered solids from step (d) with a solution of sodium silicate, preferably a solution having the approximate composition of sodium disilicate, and, preferably, using a silica dosage (defined hereinafter) of 0.70 to 0.80, to form a slurry, (f) spray drying the slurry from step (e) to form microspheres comprising the ultrafine sized solids recovered in step (d)

(g) separately ion-exchanging at least a portion of the zeolite-containing microspheres produced in step (c) and recovered in step (d), and at least a portion of the zeolite containing microspheres from step (f), to replace sodium with more desirable cations, the ion-exchange of the microspheres from step (f) being carried out by initial exchange with an ammonium salt at pH 4.5 to 5.0, followed by ion-exchange with ammonium exchange at pH 2.0–3.5, optionally but preferably followed by rare earth exchange and/or calcination followed by rare earth and/or ammonium exchange;

(h) and recovering, as separate products, the two-different types of ion-exchanged zeolitic microspheres.

When the zeolitic microspheres obtained in step (b) and recovered in step (c) are subjected to "silica retention" with sodium silicate solution to reduce micropore volume, as described in U.S. Pat. No. 4,493,902 at col. 11, 1. 62-col. 12, 1. 31; col. 15, 1. 2-21; and Example I, the ion-exchange treatment of these microspheres is also preferably carried out by initial exchange with ammonium salt at pH 4.5 to 5.0, followed by ion-exchange with ammonium salt at pH 2.0 to 3.5, preferably followed by rare earth exchange.

DESCRIPTION OF PREFERRED EMBODIMENTS

The substantially $-20$ micron sized fines that are recovered and converted, in accordance with the present invention, into a fluid cracking catalyst may be obtained as a co-product in commercial implementation of procedures such as those described in Example 1 or 2 of U.S. Pat. No. 4,493,902. The procedures include a first step of spray drying a mixture of hydrated kaolin clay and kaolin calcined to undergo the exotherm to form microspheres of hydrated kaolin clay and clay calcined to undergo the exotherm, calcining the microspheres under conditions such that the hydrated clay in the microspheres undergoes the characteristic endotherm to form metakaolin but without undergoing the exotherm whereby microspheres composed of a mixture of metakaolin and kaolin calcined to undergo the exotherm are formed. The calcined microspheres are then suspended in an aqueous alkaline solution of sodium silicate or sodium silicate with added sodium hydroxide if the available supply of sodium silicate has too low a ratio of $Na_2O/SiO_2$. A clear solution of mature (aged) amorphous sodium aluminosilicate zeolite seeds is added to the charge in the reactor and the charge is then heated until the microspheres contain at least 40%, preferably 50% to 70% crystalline faujasite (sodium form) and a silica-alumina residue of calcined clay. The bulk of the mother liquor (sodium disilicate solution) is then separated from the crystallized microspheres and the microspheres are optionally washed with water.

In plant practice, separation and washing can be carried out on a vacuum belt filter, used in conventional manner. The resulting cake of zeolitic microspheres is used as feed material for ion-exchange which may be carried out on belt filters using, for example, the continuous counter current procedure described and illustrated in U.S. Pat. No. 4,048,284. This cake constitutes the mainstream of catalyst production. Various grades of the mainstream of catalyst production may be prepared by ion-exchanging with rare earth ions after exchanging the material with ammonium ions.

In practice of the preferred embodiment of the present invention, a family of cracking catalysts is produced. One part of the family is obtained from grade sized crystallized microspheres, as described hereinabove and in U.S. Pat. No. 4,493,902, and the other part of the family is derived from the minus 20 micron fines present as a co-product in the alkaline sodium silicate mother liquor. After the fines are physically isolated from the crystallized microspheres, the processing streams containing the fines are maintained separate from those containing the crystallized microspheres. It is desirable to prevent losses of the nominally 20 micron and finer particles into the grade sized crystallized microspheres in order to maximize production of both catalysts.

Hydroclones of conventional design can be used to separate a portion of the fine particles and mother liquor from the slurry of crystallized microspheres in mother liquor. A conventional vacuum belt filter can be used to drain the remainder of mother liquor from the crystallized microspheres. The size of the openings in the weave of the fabric on the belt and the amount of vacuum applied will influence the size of particles that pass into the filtrate. One or more additional hydroclones may be used to remove grade size microspheres from the filtrate and return them to the mainstream process; leaving the nominally $-20$ micron sized particles in the filtrate. The aqueous effluent containing fine particle sized solids from the vacuum filters or from the hydroclones is processed to remove the suspended particles which are then used as feed material in the process of the present invention.

Particle size of the feed for the process of the invention is typically 10% to 70% finer than 1 micron equivalent spherical diameter (e.s.d.), preferably 50 to 70% finer than 1 micron. Particle sizes are determined by measurement on a conventional Sedigraph ® 5000 instrument. The Present invention is especially applicable to processing fines that are associated with minimal amounts of grade material, i.e., attrition resistant microspheres larger than about 20 microns. Generally, less than 20 weight percent, preferably less than 10% and, most preferably less than 5% of grade material should be present in the fines.

Feed material for use in the process of invention has been obtained by scraping filter cakes from commercial rotary vacuum filters that had been precoated with filter aid, e.g., diatomaceous earth or perlite, and collecting the cakes over a period of time. Grade material had been removed from the mother liquor prior to charging the mother liquor to the drum filters. Typical chemical compositions of such cakes appear in the illustrative examples. The sodium zeolite Y content of representative feed material is in the range of 50 to 70%. Typical $SiO_2/Al_2O_3$ molar rato of this component is about 4.4 to 4.7/1. BET surface area is typically in the range of 450 to 550 $m^2/g$ for representative feed material.

In making the determination of zeolite content and surface area, samples are dried but not washed before analysis. Procedures described in U.S. Pat. No. 4,493,902 are used in making these and other analyses described in the subject patent application.

Feed material scraped as filter cake from the precoated drum filters typically contains about 35–40% by weight of water. The cake should not be washed, dried or ground before it is mixed with sodium silicate solution and spray dried. The sodium silicate should be one having a sufficiently high $Na_2/SiO_2$ ratio to be soluble at the concentration it is used. Commercial sodium silicate such as N ® Brand ($Na_2O/SiO_2$=about 0.31), can be used. This material is supplied as a solution containing about 62 weight % water and can be used without dilution or further concentration. Preferably, the sodium silicate has a higher $Na_2O/SiO_2$ molar ratio than 0.31 e.g., a ratio of about 0.40 to 0.55. Solutions which have $Na_2/SiO_2$ ratios in this range are referred to herein as "sodium disilicate" although the silica content may be somewhat less than or more than that of a material whose analysis corresponds to $Na_2O:2.0\ SiO_2$.

Sodium disilicate solutions of approximately 40% solids ($Na_2O$ plus $SiO_2$) can be used without dilution or further concentration. Sufficient sodium silicate is added to result in a "silica dosage" in the range of about 0.60 to 0.80 preferably in the range of about 0.70 to 0.75, in the ion-exchanged microspheres, the dosage of the added silica being calculated on the volatile-free weight of the sodium-form microspheres. We have found that the silica dosage is a primary variable influencing EAI of the catalyst product and that the amount is critical.

The term "silica dosage" as used herein is defined as the weight ratio of total soluble $SiO_2$ (i.e., that provided as added sodium silicate plus that adhering to the fines after collection) to the insoluble solids content of the fines sample. The latter quantity is typically determined by washing a sample of the fines with a mild caustic solution (pH=10), filtering to remove entrained silicate, drying, and then calcining at 1500° F. for one hour. The difference between the total solids content (fines+entrained silicate) and the insoluble solids content represents the amount of adhering sodium silicate, which is then taken into account in the calculation of total silica dosage. As mentioned, the especially preferred silica dosage in the range of 0.70 to 0.75. We found that if the dosage is too low, the hardness of the product will suffer. This result was not unexpected since it is well known that it is difficult to cement large quantities of fine crystals of sodium zeolite Y. On the other hand, it was unexpected that hardness also suffered when too much sodium silicate binder was used. Physical examination of samples prepared with a silica dosages substantially in excess of those which resulted in products of acceptable hardness indicates that excessive use of silicate binder results in a low density "puffed" ball of silica in the microspheres.

Conventional spray driers can be used to convert the mixture of substantially −20 micron sized fines and sodium silicate solution into microsheres having an average diameter of about 60 to 80 microns. Optionally, hydrous kaolin clay can be included in the spray dryer feed. In operating the spray driers, the air outlet temperatures should be low, e.g., (250° F.) 120° C. or below, in order to produce microspheres of sufficiently high bulk density, i.e., about 0.85 cc/g or above, preferably 0.90 cc/g or above, and most preferably 0.95 cc/g or above. Air inlet temperatures in the range of about 400° to 1100° F. (200° to 600° C.) are recomsended. It has been found that spray dried microspheres having a bulk density below the preferred limits may have insufficient attrition-resistance to survive intact during the extensive ion-exchange treatment that is required to reduce sodium content to desired low levels of less than 1% expressed as $Na_2O$. Also, ion-exchanged products having relatively low bulk density and inadequate attrition resistance (e.g., products having EAI value of 3.5% or above) may be obtained.

Prior to ion-exchange treatment, the spray dried microspheres are strongly alkaline. The microspheres are contacted with one or more ammonium salts to form a slurry, while maintaining acidity within specified ranges as detailed hereinafter. In practice, the acidification can be carried out by adding a concentrated solution of acid, e.g., nitric acid, to the exchange solution of ammonium salts throughout the ion-exchange treatment of microspheres. It is desirable to maintain a pH low enough to ensure gellation of the silica but not sufficiently low to destroy the zeolite content of the microspheres.

More specifically, we have found that if at least the initial contact of the microspheres with ammonium ion-exchange solution is carried out at relatively high pH (4.5-5.0), catalysts of improved activity result, compared with catalysts exchanged with ammonium ion at lower pH (2.0 to 3.5). During the initial exchange about 20% of the $Na_2O$ is removed. If the initial contact with ammonium ions is at too low a pH, e.g., pH 2.0 to 3.5, silicate will precipitate on the surface of the bonded microspheres as it will if low pH is maintained throughout ammonium ion exchange. This results in a loss of cracking activity. Photographs obtained by the SEM technique suggest that use of a low pH (2.0 to 3.5) throughout ion-exchange results in coating of zeolite crystals with amorphous silica. We believe that the presence of such a coating makes the catalyst less active. On the other hand, initial treatment with a relatively high pH medium selectively dissolves a portion of the occluded silicate. This is desirable, provided that not all of the silicate binder is removed during ion-exchange treatsent. If the first exchange is at pH 5.5 to 8.5, e.g. pH 7, the Product tends to be soft as a result of the dissolution of too much silica from the microspheres. Thus, we preferably reduce the pH of the slurry of spray dried microspheres (typically pH of 10.5-11.0) to 4.5 to 5.0 with a solution of an ammonium salt acidified to a pH of 4.5–5.0. We then adjust pH downward in order to remove more sodium and thereby provide catalysts with improved activity and stability in the presence of metals. We believe that activity maintenance is attributable to low sodium content. Thus, by the two stage ammonium exchange procedure of the present invention we can readily reduce sodium ($Na_2O$) levels to values of 0.35% or below; whereas ammonium exchange at 4.5–5.0 throughout will generally permit reduction of $Na_2O$ to levels of only about 0.50%. These differences have been found to result in significant difference in activity maintenance in FCC units. We prefer to use this novel ion-exchange technique with silica-retained microspheres for the same reason we use the technique to ion-exchange microspheres obtained by spray drying co-product fines with a sodium silicate binder. In both cases, free sodium silicate is present in the microspheres undergoing ion-exchange.

We prefer to ion-exchange throughout at high temperature, e.g., 180° F. (82° C.) to 212° F. (100° C.). Operation at lower temperature, e.g., 86° F. (30° C.), results in less effective exchange efficiency. It should be noted that the ammonium ion-exchange procedure of U.S. Pat. No. 3,451,948 (supra) is carried out at 30° C. at pH 5.0–8.5 throughout. Using the ion-exchange procedure of the present invention, high temperatures will not result in fuming of ammonia as would be expected to occur when practicing the ion-exchange procedure of U.S. Pat. No. 3,451,948 because of the lower pH used throughout our process.

Sufficient sodium should be exchanged with ammonium ions to reduce the $Na_2O$ of the microspheres to a value below 1%, preferably below 0.5% and most preferably below 0.4%. The $Na_2O$ values are expressed on a volatile-free weight basis, as determined by the procedure described hereinafter. Successive treatments have been required to reduce sodium to these low levels. The ammonium exchange treatment is usually followed by ion-exchange with rare earth ions, e.g., cerium ions or a mixture of rare earth ions. The spray dried microspheres (as well as the finished catalyst product obtained therefrom) must be adequately attrition resistant to remain substantially intact during these treatments. Generally, sufficient rare earth should be introduced to result in products containing at least about 4.0% by weight rare earth(s) expressed as the oxide(s) (REO), preferably 5.0 to 7.0% REO, and, most preferably 5.0 to 6.0% REO. Ultrastable and stable forms of the zeolite can be obtained by known methods, e.g., reduction of $Na_2O$ with ammonium ions to low levels followed by calcination which may be in the presense of steam, followed by ammonium and/or rare earth exchange.

It should be noted that once the dried microspheres have been acidified they should not be dried until the exchange treatment is complete. In other words, once wetted during acidification the microspheres should not be dried until ion-exchange is complete. Conventional driers, such as a flash dryer, can be used to dry the microspheres after the termination of ion-exchange.

Catalyst of the present invention have sufficient attrition resistance for use in many commercial FCC units. In particular, the Engelhard Attrition Index (hereinafter "EAI") of products of the invention as determined by the procedure described in the publication entitled "Engelhard Attrition Index," is less than 2.0%/sec, preferably less than 1.5%/sec, and most preferably 1.0%/sec or below, prior to steaming. This publication is available to members of the public, upon request, at the Technical Information Center of Engelhard Corporation, Menlo Park, N.J. (Dewey Decimal Number 665.533 EC/EAI). Bulk density is in the range of about 0.85 to 1.10 cc/g, preferably about 0.90 to 1.10 cc/g, and most preferably about 0.95 to 1.10 cc/g.

Preferred catalysts of the invention contain about 30–45% by weight zeolite Y, the balance being predominantly silica derived from sodium silicate. The percentage of Y-faujasite zeolite in the catalyst of the present invention is best determined when the microspheres are in the sodium form (i.e., after spray drying and before ion-exchange). The zeolite content of the microspheres in sodium form is determined by technique described in the ASTM standard method of testing titled "Relative Zeolite Diffraction Intensities" (Designation D3906-80) or by an equivalent technique. When analyzed in rare earth exchanged form, the apparent content of Y zeolite will be lower, typically about 15% lower, due to absorption of X-rays by rare earth ions. Although zeolite B may be a component of the feed material such zeolite is not detectable by X-ray diffraction in the product after the ion-exchanged product is calcined or steamed. In other words, the B zeolite is converted into an amorphorus silica-alumina matrix component before or during use in a refinery. The Y-zeolite component in sodium form, generally has a crystalline unit cell size of less than about 24.75A and most preferably less than about 24.72A. Typically, the zeolite Y component has a crystalline unit cell size of about 24.69–24.72. It is believed that unit cell size range of between 24.69–24.72 corresponds to a $SiO_2/Al_2O_3$ molar ratio of the zeolite Y of about 4.54–4.20.

The catalysts of the present invention (including both the zeolitic and non-zeolitic components) preferably have a $SiO_2/AlO_3$ molar ratio of about 5.0 to 5.8 and contain less than about 0.4% by weight sodium oxide ($Na_2O$). Preferably, the catalysts contained more than about 5.0% by weight rare earth oxides(s) (REO). For the purpose of this application, all percentages of $Na_2O$ and REO in the zeolite-containing microspheres are calculated on a volatile free weight basis. The quantity of volatile material in the microspheres is determined by measuring the weight loss of the microspheres after they are calcined first for ½ hour at about 800° F. (430° C.) and then for 1 hour at about 1830° F. (1000° C.).

A chemical composition of a representative product (reported on a volatile-free weight basis) is 70% $SiO_2$; 22% $Al_2O_3$; 0.40% $Na_2O$; 5.5% REO (rare earth oxide). The analysis is reported for illustrative purposes since products of the invention will differ from each other in composition, depending inter alia on the chemical analysis of the feed material, amount of silica added as sodium silicate and the ions used in the exchange step(s). $TiO_2$ and $Fe_2O_3$ are usually indigenous impurities in the kaolin clay feed. The amounts in products of the invention vary with variations in impurity content of the starting clay. Typically, $TiO_2$ is less than 2% by weight and $Fe_2O_3$ content is less than 1% by weight.

The activity of the catalysts of the invention is within the range of that of present day cracking catalysts having moderately high activity. The outstanding performance characteristic of catalysts of the invention is low coke and hydrogen production. Consequently the catalyst can be used in cracking conventional gas oil feedstocks and show special promise when using such feedstocks in FCC units in which coke production and/or hydrogen production should be limited because of constraints imposed by the operation of the regenerator or by limitation in gas compressors. Also, the low coke formation and hydrogen production indicate that the catalysts will be of special utility when the feed-stock contains resid.

EXAMPLE 1

This example demonstrates the advantages of the two stage ion-exchange procedure of the invention. In this example the zeolite microspheres that were subjected to various ion-exchange procedures had been obtained by mixing catalyst fines of the type used in Ser. No. 532,346 with sodium silicate (about 0.47 dosage) and spray drying as described in Ser. No. 532,346, Example 1. We believe that the same observations regarding difference in pH of ammonium exchange will be observed when using fines obtained from the in situ procedures (external and internal initiators) of U.S. Pat. No. 4,493,902. Thus, the staged pH ion-exchange (procedure D in this example) was used in all of the subsequent examples in which the fines utilized were obtained as a co-product in commercial practice of embodiments of the process of U.S. Pat. No. 4,493,902.

The sample of sodium-form microspheres used in this example had the following analysis and characteristics:

| % $Na_2O$ | % $SiO_2$ | % $Al_2O_3$ | % $TiO_2$ | % $Fe_2O_3$ | zeolite Y index | zeolite B index | unit cell size |
|---|---|---|---|---|---|---|---|
| 18.2 | 56.2 | 23.7 | 1.01 | 0.27 | 15 | 0.47 | 24.69 |

The sample was ammonium ion exchanged by five successive contacts with a 1:2 dilution of 54% aqueous ammonium nitrate solution, each at 180° F. (82° C.) for one hour. Each exchange step was conducted at 25% catalyst solids, and at carefully maintained pH, both during initial catalyst addition and in subsequent exchange steps, by the dropwise addition of concentrated nitric acid as required.

In system A, the pH of the catalyst/ammonium nitrate slurry was rigorously maintained in the range of 2.4–2.7 for each of the five successive exchange steps. In system B, the pH range maintained was 3.0–3.5, and in system C the pH range was 4.5–5.0. In the exchange system D, the first two exchanges were maintained in the pH range of 4.5–5.0, and the following three exchanges were maintained in the pH range of 2.4–2.7.

After ammonium ion exchange treatment, each of the catalysts was rare earth ion exchanged by two successive contacts with a rare earth solution (commercial mixed rare earth nitrate)containing 3.50% ReO (relative to the volatile free catalyst weight). Each of the rare earth ion exchange treatments was conducted for a period of one hour at 180° F. (82° C.), maintaining 30% catalyst solids and a pH in the range of 3.0–3.5. Finished catalysts were analyzed for sodium and rare earth content, hardness (by EAI), and activity by MAT testing after steam deactivation for 4 hours at 1450° F. (788° C.) (100% steam). The results are summarized in TABLE I.

TABLE I

Effects of Variable Ammonium Ion Exchange pH on Activity and Hardness of Catalysts Produced from Co-Product Fines and Sodium Silicate Binder

| System | Exchange pH | % $Na_2O$ | % ReO | % Conversion* | RMA** | EAI |
|---|---|---|---|---|---|---|
| "A" | 5 × (2.4–2.7) | 0.36 | 3.92 | 70.0 | 77 | 1.66 |
| "B" | 5 × (3.0–3.5) | 0.48 | 3.48 | 70.9 | 81 | 1.85 |
| "C" | 5 × (4.5–5.0) | 0.51 | 4.19 | 76.5 | 108 | 1.92 |
| "D" | 2 × (4.5–5.0) + 3 × (2.4–2.7) | 0.35 | 2.94 | 75.5 | 102 | 1.90 |

*% Conversion (MAT) value reported is after 4 hours/1450° F. (788° C.) (100% steam). See U.S. Pat. No. 4,493,902 for details of the MAT test and pre-steaming treatment.
**RMA value reported is relative to HEZ ™-53 Catalyst (3.03 activity after steaming 4 hours/1450° F., (788° C.) 100% steam).

In Table I, data on $Na_2O$/ReO exchange levels, activity performance and hardness on the four experimental systems is presented. It can readily be seen that as the pH of ammonium ion exchange is increased (systems A through C), activity increases markedly, even though the efficiency of sodium exchange (as evidenced from increasing $Na_2O$ levels) is reduced. The effect on product attrition resistance is only slight (ca. 0.2 EAI units increase when exchange at higher pH). System D appears to present the most desirable exchange procedure, in that both a low $Na_2O$ level (as may be desirable from the standpoint of catalyst metals tolerance performance) and a high activity level result.

EXAMPLE 2

This example demonstrates the importance of controlling silica dosage when producing a cracking catalyst from drum dryer fines obtained as a co-product in the manufacture of high zeolite content microspheres by the internal zeolite growth seed in situ procedure substantially as described in Example 6 of the '902 patent.

The feed material used in this example was a sample of the fine (−20 micron) particle size fraction recovered as a moist cake from conventional vacuum drum filters operating in a plant utilizing procedures substantially as described in Example 6 of U.S. Pat. No. 4,493,902. The filter aid employed in operating the drum filters was diamaceous earth. The feed contained approximately 60% zeolite Y (the balance being a mixture of diatomaceous earth and the crystallization residue of calcined clay). Representative fines used in this example had the following chemical and physical properties:

| % Total Solids | % Insoluble Solids* | % $Na_2O$ | % $SiO_2$ | % $Al_2O_3$ | % $TiO_2$ | % $Fe_2O_3$ |
|---|---|---|---|---|---|---|
| 55.3 | 34.0 | 10.4 | 54.5 | 32.8 | 1.28 | 0.29 |

| zeolite Y Index | zeolite B Index | $SiO_2/Al_2O_3$ | BET surface area, m²/g |
|---|---|---|---|
| 65 | 0.36 | 4.65 | 482 |

*Measured as defined hereinabove to account for total soluble silica.

In the case of samples prepared with a 0.70 silica dosage (defined hereinabove) 2946g of sample of the above fines was slurried in 104 g of a sodium silicate solution (27.2% $SiO_2$, 15.2% $Na_2O$) with vigorous agitation. The amount of total soluble silicate in this system was varied to provide the desired $SiO_2$ dosages. Each mixture was spray dried using a nozzle atomization drier, maintaining an inlet temperature of 250°–275° C.

(482° to 527° F.) and an outlet temperature of 105°–120° C. (221° to 248° F.). Each batch of resulting microspheres was then repeatedly exchanged with an ammonium nitrate solution to lower the sodium content to a value below 1% Na₂O (see Example 1, System D), and then rare earth ion exchanged as described in Example 1, System D.

The results, summarized below in Table II, show that the silica dosage level chosen was a critical determining factor of product hardness, and that a dosage value of 0.70 appears to yield the most favorable results.

TABLE II

| Effect of Silicate Dosage on Product Hardness | | |
|---|---|---|
| SiO₂ Dosage | Na⁺ form EAI | RE⁺³ form EAI |
| 0.45 | 1.9 | — |
| 0.55 | 1.0 | 2.4 |
| 0.70 | 0.64 | 1.7 |
| 0.70 | 0.51 | 1.9 |
| 0.75 | 0.62 | 2.1 |
| 0.80 | 0.83 | 2.9 |
| 0.90 | 1.8 | 3.5 |

EXAMPLE 3

It was further determined that suitably attrition resistant microspheres could be prepared from the fines obtained as a co-product by the internally seeded variation of the '902 process, such as described in Example 6 of U.S. Pat. No. 4,493,902 patent, by addition of a quantity of hydrous kaolin (e.g., ASP ®-600 clay) along with sodium silicate in the spray drying step. This addition of hydrous clay may be desirable from the standpoint of improved economics due to the relatively low cost of the added clay, and as a potential means to modify catalyst activity. Variable amounts of added ASP-600 ® kaolin clay and sodium silicate binder were utilized with the fines described in Example 2. In each case, the silica dosage quoted was calculated based on the total quantity of insoluble solids, (fines+added ASP-600).

The sample with 0.55 SiO₂ dosage and 10% added ASP-600 was prepared as follows. A 3145 g sample of fines (45.5% total solids, 31.8% insoluble solids) and 119 g ASP-600 clay (16.0% LOI) were slurried in 1179 g sodium silicate solution (27.2% SiO₂; 15.2% Na₂O) with vigorous agitation. This mixture was spray dried and then ammonium and rare earth ion exchanged as in Example I, System D. In rare earth ion exchanged form, this sample had EAI of 1.9 after calcination at 1100° F.

Examination of the data shown in Table II reveals that the levels of added sodium silicate and ASP-600 clay must be carefully chosen so as to result in an attrition resistant catalyst. In this instance, a system containing 10% added ASP-600 with a 0.55–0.60 SiO₂ dosage appears to yield the best results.

TABLE II

| Effects of Added ASP-600 and Silica Dosage on Product Hardness | | | |
|---|---|---|---|
| SiO₂ Dosage | % Added ASP-600 | Na⁺ form EAI | RE⁺³ form EAI |
| 0.45 | 10 | 1.4 | — |
| 0.45 | 25 | 0.93 | 2.3 |
| 0.45 | 50 | 1.3 | — |
| 0.50 | 10 | 1.1 | — |
| 0.55 | 10 | 0.66 | 1.9 |
| 0.55 | 25 | 0.98 | 2.4 |
| 0.55 | 50 | 1.2 | 2.5 |
| 0.60 | 10 | 0.52 | 2.1 |
| 0.63 | 10 | 0.68 | 2.4 |
| 0.63 | 25 | 1.4 | 3.2 |
| 0.63 | 50 | 1.8 | — |
| 0.70 | 10 | 0.52 | 2.3 |
| 0.70 | 25 | 1.6 | 4.5 |
| 0.70 | 50 | 2.3 | — |

Catalyst prepared from fines in the preceding examples exhibit very high cracking activity in rare earth ion exchanged form, as well as low coke make and high gasoline yield. Results from the MAT testing of two representative samples are shown in Table III. The MAT test is described in the U.S. Pat. No. 4,493,902 patent.

TABLE III

| MAT Activity/Selectivity Characteristics of Catalysts Prepared from Catalyst Co-Product Fines | | | | | | |
|---|---|---|---|---|---|---|
| | Sample | | | | | |
| Steam Treatment* | (0.70 Dosage) 0.46% Na₂O, 6.83% ReO | | | (0.55 Dosage, + 10% ASP-600) 0.48% Na₂O, 5.82% ReO | | |
| (100% Stm.) | 1400° | 1450° | 1500° | 1400° | 1450° | 1500° |
| % Conversion | 90.5 | 86.7 | 75.9 | 87.8 | 83.9 | 71.5 |
| % Gasoline | 55.1 | 57.3 | 56.1 | 54.0 | 56.1 | 54.3 |
| % LCO | 7.30 | 9.79 | 15.2 | 8.56 | 11.1 | 17.2 |
| % C₄ Gas | 23.8 | 20.2 | 14.5 | 22.7 | 19.6 | 12.9 |
| % Coke | 11.6 | 9.16 | 5.32 | 11.2 | 8.27 | 4.24 |

*Each sample was steamed for 4 hours at the temperature indicated.

EXAMPLE 4

This example demonstrates the importance of controlling silica dosage when producing a cracking catalyst from drum dryer fines obtained as a by-product in the manufacture of high zeolite content microspheres by the externally seeded zeolite in situ procedure substantially as described in Example 1 of the '902 patent. The example further demonstrates the improved hardness of the products obtained from o-product fines generated during external zeolite growth initiation as compared to products obtained from co-product fines generated during internal seeding.

Feed was a blend of batches of slurries of co-product fines. For purposes of analysis, a portion of the feed was filtered, washed with deionized water and oven dried at about 220° F. (105° C.). Following are analytical and physical properties:

| Chemical Analysis, wt % | | | | | |
|---|---|---|---|---|---|
| LOI | Al₂O₃ | SiO₂ | Fe₂O₃ | TiO₂ | Na₂O |
| 20.61 | 31.6 | 54.2 | 0.39 | 1.26 | 11.52 |

| Physical Properties (Particle Size) Particle size determined by Microtrac | | | | |
|---|---|---|---|---|
| Microns | 0–20 | 0–40 | 0–60 | 0–80 | av. |
| % | 41 | 70 | 83 | 90 | 23 |

Particle size determined by Sedigraph ® analyzer - 25% Solids 0% <2 micron 4% <5 micron 36% minus 10 micron 63% <20 microns; average —14 microns.

The feed was mixed with sodium silicate solution (0.65 dosage) (15.2 %Na₂O; 27.2 %SiO₂), and spray dried. The procedure was repeated within other portions of the same feed but using a 0.70 silica dosage.

Spray drying was carried out in a nozzle spray dryer operated with a feed rate of about 350 cc/min., air pressure of about 35 psi, inlet temperature of 245°–255° C., outlet temperature of 110–120, cyclone pressure drop of 7"H$_2$O and nozzle internal diameter of 0.09". The microspheres were ion-exchanged as described in Example 1, D.

Following is an analysis of the two product, Sample A, 0.65 silica dosage and Sample B, 0.70 silica dosage.

| Sample | LOI | Chemical Analysis, wt % | | | | | |
|---|---|---|---|---|---|---|---|
| | | Al$_2$O$_3$ | SiO$_2$ | Fe$_2$O$_3$ | TiO$_2$ | Na$_2$O | REO |
| A | 19.0 | 21.4 | 71.6 | 0.26 | 0.80 | 0.39 | 5.72 |
| B | 18.99 | 23.99 | 68.4 | 0.27 | 0.88 | 0.37 | 6.10 |

| | Physical | | | | |
|---|---|---|---|---|---|
| | Particle Size | | | | |
| Microtrac % | 0–20 micron | 0–40 micron | 0–60 micron | 0–80 micron | Av. size micron |
| A | 4 | 17 | 32 | 49 | 80 |
| B | 3 | 17 | 31 | 49 | 80 |

| | Bulk Density | Surface Area | Zeolite Y Index | Zeolite B Index | UCS |
|---|---|---|---|---|---|
| A | 0.64 | 326 | 20 | 0 | 24.69 |
| B | 0.89 | 335 | 23 | 0 | 24.68 |

| EAI (calcined 1100° F./1 hour 200/270 mesh) | |
|---|---|
| A | 2.4 |
| B | 0.92 |

Catalytic properties as determined by the MAT procedure are summarized in Table IV.

TABLE IV

| STEAMING TEMP. (°F.) | CONV. | ACT | H$_2$ | IC$_4$ | GAS | GSL | LCO | BTTMS | COKE | DRY GAS | H$_2$/CH$_4$ | C$_4$=/TC4 | IC4/C$_4$= |
|---|---|---|---|---|---|---|---|---|---|---|---|---|---|
| Sample A | | | | | | | | | | | | | |
| 1449 | 83.70 | 5.14 | 0.03 | 7.55 | 20.27 | 55.62 | 11.80 | 4.50 | 7.81 | 2.22 | 0.40 | 0.16 | 4.19 |
| 1449 | 82.22 | 4.62 | 0.03 | 7.43 | 19.94 | 12.47 | 54.53 | 5.31 | 7.75 | 2.16 | 0.34 | 0.16 | 4.09 |
| 1505 | 44.99 | 0.82 | 0.02 | 2.23 | 7.77 | 34.76 | 23.82 | 31.19 | 2.47 | 0.79 | 0.73 | 0.35 | 1.52 |
| 1505 | 52.75 | 1.12 | 0.03 | 2.42 | 8.42 | 41.43 | 24.88 | 22.37 | 2.90 | 0.87 | 0.90 | 0.35 | 1.53 |
| 1551 | 10.92 | 0.12 | 0.02 | 0.26 | 1.64 | 8.05 | 22.97 | 66.11 | 1.23 | 0.48 | 1.77 | 0.53 | 0.68 |
| 1551 | 11.37 | 0.13 | 0.02 | 0.25 | 1.65 | 8.40 | 23.02 | 65.62 | 1.31 | 0.38 | 1.80 | 0.59 | 0.54 |
| Sample B | | | | | | | | | | | | | |
| 1450 | 84.38 | 5.40 | 0.04 | 7.79 | 21.00 | 54.99 | 11.42 | 4.20 | 8.39 | 2.63 | 0.43 | 0.16 | 4.28 |
| 1452 | 86.43 | 6.37 | 0.04 | 8.09 | 21.55 | 55.91 | 9.87 | 3.70 | 8.97 | 2.75 | 0.53 | 0.14 | 4.82 |
| 1505 | 71.04 | 2.45 | 0.04 | 4.80 | 14.07 | 52.32 | 18.73 | 10.24 | 4.64 | 1.45 | 0.80 | 0.25 | 2.44 |
| 1505 | 69.46 | 2.27 | 0.03 | 4.58 | 13.64 | 51.46 | 19.45 | 11.08 | 4.36 | 1.32 | 0.70 | 0.27 | 2.22 |
| 1550 | 24.45 | 0.32 | 0.00 | 0.96 | 4.96 | 18.15 | 25.99 | 49.56 | 1.34 | 0.81 | 1.92 | 0.58 | 0.71 |
| 1550 | 25.01 | 0.33 | 0.01 | 1.77 | 3.91 | 19.88 | 25.33 | 49.66 | 1.22 | 0.17 | 1.95 | 0.48 | 1.05 |

EXAMPLE 5

The procedures of Example 4 were repeated with other samples of fines obtained as a co-product of externally seeded zeolite microsphere synthesis in accordance with the teaching of U.S. Pat. No. 4,493,902. Attrition resistance data for preparation formulated at various silica dosages ranging from 0.70 to 0.80 without hydrous clay addition and 0.55 with hydrous clay addition followed by ion-exchange in accordance with the present invention. A comparison of the results (TABLE V) with data in Examples 2 and 3 (internal seeds) surprisingly shows a substantial increase in hardness for the externally seeded material, when spray dried both "as is" and with 10% added ASP-600 clay.

TABLE V

| Catalyst Prepared from Externally Seeded Catalyst Fines | | | |
|---|---|---|---|
| SiO$_2$ Dosage | % Added ASP-600 | Na$^+$ Form EAI (uncalcined) | ReO Form EAI (calcined) |
| 0.70 | 0 | 0.30 | 0.69 |
| 0.80 | 0 | 0.48 | 0.92 |
| 0.55 | 10 | 0.27 | 0.73 |

This unexpected increase in hardness prompted an examination of the internally and externally seeded fines for any differences in chemical or physical properties. Characteristics of the fines sample used in the study are shown below. Upon examination of the data, it can be seen that the two types of fines are very similar in overall composition, except the zeolite B content of the externally seeded sample is lower. It has been observed in studies that hardness increases with reduced zeolite B content; this observation may serve at least in part to explain the hardness difference. SEM examination of both types of fines confirmed the presence of a greater amount of zeolite B in the internally seeded fines. Both samples were relatively coarse and we consider that it is unlikely that particle size distribution made a difference. Full X-ray scans failed to show major differences.

| Fines Type | % Al$_2$O$_3$ | % SiO$_2$ | % Na$_2$O | % TiO$_2$ | % Fe$_2$O$_3$ |
|---|---|---|---|---|---|
| External | 33.8 | 53.3 | 10.1 | 1.24 | 0.36 |
| Internal | 32.8 | 54.5 | 10.4 | 1.28 | 0.29 |

| Fines Type | Y Index | B Index | UCS | Surface Area |
|---|---|---|---|---|
| External | 59 | 0.14 | 24.68 | 536 |
| Internal | 65 | 0.36 | 24.68 | 482 |

| | PSD (by Sedigraph) | | | | |
|---|---|---|---|---|---|
| Fines Type | % < 1μ | % < μ | % < 5μ | % < 10μ | Av. (μ) |
| External | 1 | 2 | 31 | 48 | 11 |
| Internal | 0 | 0 | 16 | 72 | 7.6 |

It is not unreasonable to expect that fines produced during the externally seeded variation of the process may also have different surface characteristics than the internally seeded material (for example, a greater concentration of surface hydroxyl groups) which could improve binding efficiency.

EXAMPLE 6

Catalytic Evaluation of Catalyst Made from Fines

Selected samples of spray dried fines, described in Examples 2, 3, 4, and 5 which met the objective of <2.0 EAI were evaluated for catalytic activity and selectivity after being exchanged by the following base exchange procedures (one initial $NH_4NO_3$ exchange at pH 4.5-5.0, followed by four subsequent exchanges at pH 2.7-2.9; then two rare earth exchanges, each at a 5.0% dosage, pH 2.7-2.9). Details of the ion-exchange treatment appear in Example 1. This exchange procedure resulted in $Na_2O$ levels of 0.43-0.48%, and ReO levels of 5.7-7.6%. An additional sample, was evaluated at lower $Na_2O$ content, obtained after seven $NH_4NO_3$ exchanges.

| Description | Composition of Product | |
|---|---|---|
| | % $Na_2O$ | % ReO |
| "As is"* 0.70 silica dosage, Internally seeded (7× BEX) | 0.16 | 3.83 |
| "As is" 0.70 dosage, Internally seeded (5× BEX) | 0.46 | 6.83 |
| + 10% ASP-600, 0.60 dosage, Internally seeded | 0.46 | 5.71 |
| + 10% ASP-600, 0.70 dosage, Internally seeded | 0.43 | 7.63 |
| "As is" 0.70 dosage, Externally seeded | 0.48 | 6.34 |

*"As is" represents no added clay.
*BEX represents number of exchange treatment with ammonium nitrate.

Activity/selectivity plots were made to evaluate catalytic performance as determined by the MAT procedure for samples steamed at 1400° F. -1500° F. (760° C. to 816° C.) and above. It was observed that all catalysts were of high activity [ca. 1.7-2.2 times that of HEZ-53 ™ catalyst at 1450° F. (788° C.)] throughout the 1400°-1500° F. (760° to 816° C.) steaming range with the exception of the one sample prepared using externally seeded fines, which fell off sharply after 1500° F. (816° C.) steaming. Further MAT studies of catalysts prepared from externally seeded fines would be needed to confirm these results. All catalysts dropped sharply in activity when steamed above 1500° F. This was especially evidenced with the sample containing (0.16% $Na_2O$) which had the best activity at 1500° F. (most likely due to the low sodium content), but experienced nearly complete deactivation at 1520° F. (827° C.). Note that this sample also had a substantially lower rare earth content than the others tested, but still compared relatively favorably in hydrothermal stability.

Coke selectivities of the catalysts tested were all very low, equivalent or slightly lower than samples of catalyst obtained from fines by the procedure of Ser. No. 532,346. Gasoline and bottoms selectivities were also comparable to catalyst prepared from catalyst fines by the procedure of Ser. No. 532,346. In conclusion, it is apparent that fines produced from either the internally or externally initiated variations of the '902 patent may be successfully processed into attrition resistant catalysts with higher activity and comparable selectivity relative to catalysts obtained by the procedure of Ser. No. 532,346.

We claim:

1. A process for producing a family of fluid cracking catalysts which comprises
   (a) mixing microspheres of kaolin clay calcined at least substantially through the characteristic exotherm and metakaolin with a solution of sodium silicate or sodium silicate and sodium hydroxide, said mixture also containing a sodium aluminosilicate zeolite seeding material either contained in the microspheres or mixed into said solution of sodium silicate or sodium silicate and sodium hydroxide;
   (b) heating the mixture until crystals of sodium zeolite Y form in the microspheres, resulting in the formation of an alkaline sodium silicate mother liquor, microspheres containing at least 40% sodium zeolite Y, and ultrafine crystals of sodium zeolite Y and other ultrafine solids;
   (c) separating microspheres from step (b) from said mother liquor under conditions such that ultrafine crystals of zeolite Y and other ultrafine solids are recovered as an aqueous effluent;
   (d) recovering said ultrafine crystals of sodium zeolite Y and other ultrafine solids from the aqueous phase;
   (e) mixing the recovered solids from step (d) with a binder effective amount of sodium silicate to form a slurry,
   (f) spray drying said slurry from step (e) to form microspheres comprising ultrafine solids recovered in step (d) and including crystals of sodium zeolite Y;
   (g) forming at least a portion of the zeolite-containing microspheres from step (b) and at least a portion of the zeolite-containing microspheres from step (f) into separate slurries;
   (h) and separately ion-exchanging the microspheres in the separate slurries to replace sodium with more desirable cations; the pH being initially in the range of 4.5 to 5.0 and thereafter 2.0 to 3.5 when ion-exchanging microspheres from step (f), and
   (i) and recovering as separate products the two-different types of ion exchanged zeolitic microspheres.

2. The process of claim 1 wherein said seed material is a clear solution of amorphous sodium aluminosilicate which is mixed with the solution of sodium silicate or sodium silicate and sodium hydroxide.

3. The process of claim 1 wherein the composition of the sodium silicate used in step (e) is approximately that of sodium disilicate.

4. The process of claim 3 wherein the $Na_2O/SiO_2$ molar ratio of the sodium silicate used in step (e) is in the range of 0.40 to 0.55.

5. The process of claim 2 wherein at least a portion of the sodium silicate used in step (e) is obtained from sodium disilicate formed in step (b) and separated as mother liquor in step (c).

6. The process of claim 1 wherein substantially all of the solids recovered in step (d) are finer than about 20 microns equivalent spherical diameter.

7. The process of claim 1 wherein the material recovered in step (d) comprises about 50 to 70% sodium zeolite Y.

8. The process of claim 1 wherein the material recovered in step (d) is saturated with sodium silicate.

9. The process of claim 1 wherein the product obtained by ion-exchanging the microspheres from step (f) has an EAI of 1.5%/sec or below.

10. The process of claim 1 wherein the microspheres from step (f) are ion-exchange with an ammonium salt to reduce the sodium content initially at a pH in the range of 4.5 to 5.0 and thereafter at about pH 2.5 to 3.0 and then ion-exchanged with a rare earth salt at pH in the range of about 3.0 to 3.5 without an intermediate drying step.

11. The process of claim 1 wherein the microspheres from step (b) are successively ion-exchanged with an ammonium salt until the $Na_2O$ content is below about 0.5%.

12. The process of claim 10 wherein the microspheres from step (f) are successively ion-exchanged with an ammonium salt until the $Na_2O$ is below about 0.5%.

13. The process of claim 1 wherein sufficient sodium silicate is added in step (e) to result in a silica dosage of 0.60 to 0.80.

14. The process of claim 13 wherein the silica dosage is in the range of 0.70 to 0.75.

15. The process of claim 1 wherein said microspheres produced in step (f) analyze from about 30 to 45% sodium zeolite Y.

16. The process of claim 1 in which hydrous kaolin clay is incorporated with the recovered solids and binder effective amount of sodium silicate to form the slurry in step(e).

17. Catalyst obtained by ion-exchanging the microspheres from steps (f) and step (h) of claim 1.

* * * * *

UNITED STATES PATENT AND TRADEMARK OFFICE
CERTIFICATE OF CORRECTION

PATENT NO. : 4,581,340
DATED : April 8, 1986
INVENTOR(S) : Francis L. Himpsl, Robert W. Andrews, Barry K. Speronello It is certified that error appears in the above-identified patent and that said Letters Patent are hereby corrected as shown below:

Column 1, Line 22 correct by deleting [X]

Column 4, Line 37 delete the work [driej] and insert --dried--

Column 7, Line 31 delete [$Na_2/SiO_2$] and insert --$Na_2O/SiO_2$--

Column 8, Line 21 delete [recomsended] and insert --recommended--

Column 8, Line 63 delete [tratsent] and insert --treatment--

Column 17, after line 9 and before line 10 insert --The samples tested were as follows:--

Signed and Sealed this

Thirteenth Day of January, 1987

Attest:

DONALD J. QUIGG

Attesting Officer     Commissioner of Patents and Trademarks